Sept. 29, 1936.　　　S. C. SHIRLEY　　　2,055,507
ENAMEL COATING FOR CANS
Filed July 5, 1933
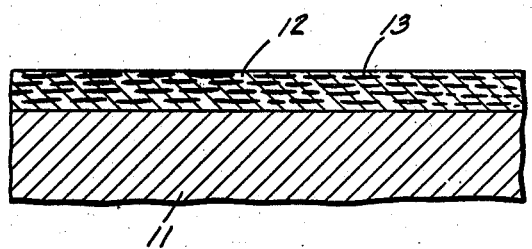
INVENTOR
Samuel C. Shirley
BY Ivan D. Thornburgh
Charles H. Cope
ATTORNEYS Patented Sept. 29, 1936

2,055,507

UNITED STATES PATENT OFFICE 2,055,507

ENAMEL COATING FOR CANS

Samuel C. Shirley, Oak Park, Ill., assignor to American Can Company, New York, N. Y., a corporation of New Jersey Application July 5, 1933, Serial No. 679,098

4 Claims. (Cl. 220—64)

This invention relates to coating materials and, while its advantages and uses will be hereinafter described in connection with the manufacture of sheet metal containers, as tin cans for food products, it will be manifest that it has other valuable uses.

Prior to the instant invention tin cans have been generally provided for the packaging of food products and much experimentation has been undertaken to provide special coatings for particular products to prevent undesirable reaction between the metal or metals of the can and the packaged materials. Various compoundings of oleo-resin, and synthetic resin varnishes and enamels have been provided and several of these have attained wide commercial use.

A principal object of the present invention is improvement in coatings of this character to the end that the metal may be more perfectly and fully protected against chemical reaction with the food products, against corrosion, abrasion of the coating, and the coating itself may be better able to withstand attack from the food products before, during and after processing.

These ends are accomplished in accordance with the instant invention by incorporating into the varnish or enamel an inert material in the form of flaked particles automatically arranging themselves in leaf or overlapping relation in the final coating. The preferred inert material is mica,—and aluminum bronze may be used.

The accompanying drawing illustrates, more or less graphically, how the inert particles or flakes of mica arrange themselves in the varnish or enamel coating. The drawing represents a fragmentary, enlarged, cross sectional view of a sheet metal container wall having a coating embodying the present invention applied on the interior side thereof. Reference numeral 11 indicates the sheet metal of a container wall, 12 indicates the enamel or varnish coating, which contains flaked particles 13 which automatically arrange themselves in leaf or overlapping relation, substantially as illustrated.

Experiment has demonstrated that a can coated with enamel containing mica or the like will not soften during the processing of pumpkins contained in the can, will not blister during or as a result of a processing of meat, chicken or fish, and will provide a final impervious and unbroken coating during and after the processing of such food products as spinach, beet tops, and the like.

It has also been established that a coating containing mica is harder, more impervious to fruit acids and alkalis than are the same coatings unfortified with the mica. It has also been discovered that coatings containing mica are less susceptible to abrasion in the usual process of manufacturing cans from the coated stock and the handling and closing of them in the canning plant.

The fortifying properties of the coating are believed in part at least to be the result of a shielding action, the mica being more or less matted, forming a barrier against the penetration or entrance through the coating of acids, where an acid product is packed in the can, or a barrier to any juices of a non-acid product. This barrier effect is also present to prevent steam striking through the coating and forming a blister thus lifting the coating material off the can surface and allowing the moisture to work directly on and corrode the metal of the can.

The mica may be used with most of the resin varnishes generally employed for the lining or coating of cans. A typical varnish or vehicle may be compounded as follows:

| | |
|---|---|
| I rosin | lbs 20 |
| Copal gums | lbs 80 |
| Heat treated China wood oil | gals 15 |
| Manganese resinate, ppt | oz 12 |
| Mineral spirits | gals 28 |

The compounding is accomplished by melting copal gum in an open kettle by heating to 630° F. in 25 minutes with occasional stirring. Thereafter the charge is permitted to cool to 590° in five minutes. It is reheated to 650° in five minutes when the rosin is added. The charge is allowed to cool to room temperature and China wood oil and the drier are added and the temperature is raised to 500° F. in fifteen minutes. Heating and cooling treatments are continued until the melted mix strings when permitted to drop from a stirring paddle.

The mica, in amount of approximately from one to five pounds to the gallon of vehicle, is finely ground in a paint grinding mill with only sufficient vehicle to facilitate the action of the grinder and is then stirred and mixed thoroughly into the varnish.

The resulting varnish may be spread upon the tin plate from which the cans are made and it will withstand either air drying or baking. It may also be sprayed upon the can after formation through the use of spraying machines now used for spraying cans. Mica is inert, tasteless and odorless and forms a continuous binding and strengthening medium in the coating and also acts as a physical shield or barrier to prevent liquids, steam etc. from passing through the coating and reaching the metal can wall.

The resulting varnish may also be advantageously employed for the coating of the outside of cans which are to be processed in a steam retort. Thus used, the coating containing the mica has decided advantage in that it prevents the coating from blistering under the heat and action of the steam. Cans so treated externally will more successfully stand the processing and subsequent controlled water cooling than will cans coated with the same material unfortified by the mica. Examination of the varnish or enamel coating containing the mica has disclosed the circumstance that the fine mica particles are in flake form and are arranged in the final coating in parallel, overlapping relation so that any liquid or other substance coming through the coating strikes against a mass of these flakes and must work around the ends of each flake if it is to penetrate further. This is what is meant by an impervious coating.

It is thought that the invention and many of its attendant advantages will be understood from the foregoing description, and it will be apparent that various changes may be made in the ingredients described and their percentages without departing from the spirit and scope of the invention or sacrificing all of its material advantages, the ingredients and percentages hereinbefore described being merely a preferred embodiment thereof.

I claim:

1. A sheet metal container for food products having a coating of a varnish containing inert material in flaked form and arranged with the flakes parallel with the surface of the coating and in overlapping relation to provide a shielding medium between the metal of the container wall and a said food product packed in said container.

2. A sheet metal container having a coating consisting of a resin varnish and mica in the proportions of substantially one to five pounds of mica to one gallon of varnish the mica being arranged in parallel flake formation within the varnish to provide a barrier against the penetration of foreign substances into the coating.

3. A container for food products likely to soften an enamel coating of the container during processing, comprising a sheet metal container coated internally with a varnish containing mica the mica providing a barrier to prevent the steam of processing from penetrating the coating.

4. A container for food products requiring processing, comprising a tin container coated externally with a varnish coating containing mica the mica providing a barrier to prevent the steam of processing from penetrating into and through the coating.

SAMUEL C. SHIRLEY.